(12) United States Patent
Keller et al.

(10) Patent No.: US 7,513,687 B2
(45) Date of Patent: Apr. 7, 2009

(54) LINEAR ROLLING BEARING

(75) Inventors: Peter Keller, Bruchmuhlbach-Miesau (DE); Peter Heipt, St. Ingbert (DE); Dietmar Rudy, Kleinbundenbach (DE); Thomas Winkler, Sulzbach/Saar (DE); Ralf Moseberg, Kindsbach (DE); Michael Heid, Kleinblittersdorff (DE)

(73) Assignee: Ina-Schaeffler KG, Herzogenaurach (DE)

( * ) Notice: Subject to any disclaimer, the term of this patent is extended or adjusted under 35 U.S.C. 154(b) by 0 days.

(21) Appl. No.: 11/879,590

(22) Filed: Jul. 18, 2007

(65) Prior Publication Data

US 2008/0044116 A1 Feb. 21, 2008

Related U.S. Application Data

(62) Division of application No. 10/632,609, filed on Aug. 1, 2003, now abandoned.

(30) Foreign Application Priority Data

Aug. 3, 2002 (DE) ................... 102 35 539

(51) Int. Cl.
*F16C 29/06* (2006.01)

(52) U.S. Cl. .......................... 384/45; 384/43

(58) Field of Classification Search .................... 384/43, 384/45, 520, 44
See application file for complete search history.

(56) References Cited

U.S. PATENT DOCUMENTS

| | | | |
|---|---|---|---|
| 6,652,146 B2 * | 11/2003 | Lee ............................ | 384/45 |
| 2003/0039414 A1 * | 2/2003 | Niwa et al. ................... | 384/51 |

FOREIGN PATENT DOCUMENTS

| | | | |
|---|---|---|---|
| DE | 26 18 535 | * | 11/1977 |
| JP | 05-126149 | * | 5/1993 |

* cited by examiner

*Primary Examiner*—William C Joyce
(74) *Attorney, Agent, or Firm*—Charles A. Muserlian

(57) ABSTRACT

In a linear rolling bearing comprising a guide rail (1) and a guide carriage (2) that partially surrounds the guide rail (1) and is supported for sliding through rolling elements (3) on two long sides of the guide rail (1), the rolling elements (3) being arranged on each of the two long sides in at least two parallel, endlessly re-circulating rows (4, 5) of rolling elements (3) while a spacer (6) is inserted between every two successive rolling elements (3) of a row (4, 5), on each long side of the guide rail (1), a common spacer (7) for both rows (4, 5) is inserted between every two adjacent rolling elements (3) of the one row (4) and between every two adjacent rolling elements (3) of the other row (5).

7 Claims, 2 Drawing Sheets

US 7,513,687 B2

LINEAR ROLLING BEARING

PRIOR APPLICATON

This application is a division of U.S. patent application Ser. No. 10/362,609 filed Aug. 1, 2003, now abandoned.

FIELD OF THE INVENTION

The invention concerns a linear rolling bearing comprising a guide rail and a guide carriage that partially surrounds the guide rail and is supported by rolling elements for sliding on two long sides of the guide rail, the rolling elements being arranged on each of the two long sides in at least two parallel, endlessly re-circulating rows of rolling elements while being guided by spacers that are situated in said two rows between the rolling elements.

BACKGROUND OF THE INVENTION

Linear bearing guides are known in which the rolling elements are guided by separate, inter-connected chain links. These re-circulating chains are configured as pull chains. It is also known from a number of patent publications that such a pull chain can be configured as an open or a closed chain. Furthermore, there already exist several patent applications that describe a pull chain not only for a single row of rolling elements but also as double sprocket chains for two re-circulating rows of rolling elements. One such construction is disclosed in the publication EP 0 845 611 A1. This shows a linear rolling bearing of the initially cited type in which an open chain is used on each long side of the guide rail as a guide for two endlessly re-circulating rows of balls. Each chain comprises in its central region situated between the rolling element rows, a flexible connecting strip on whose long sides spacers are arranged spaced behind one another. Rolling elements configured as balls are arranged in the spaces between the spacers. This construction therefore results in the formation of a double row ball chain. However, this chain has drawback that the individual chain links can rupture easily.

OBJECTS OF THE INVENTION

It is an object of the invention to provide a linear rolling bearing that is silent in running and possesses a high level of operational safety.

This and other objects and advantages of the invention will become obvious from the following detailed description.

SUMMARY OF THE INVENTION

According to a first proposal, the invention achieves the above objects by the fact that on each long side of the guide rail, a common spacer for both of said two rows is inserted between every two adjacent rolling elements of a first of said two rows and between every two adjacent rolling elements of a second of said two rows. According to a second proposal, the invention achieves the above objects by the fact that on each long side of the guide rail, every two adjacent rolling elements of a first of said two rows and every two adjacent rolling elements of a second of said two rows are guided in a common spacer for both of said two rows. In this way, chains can be dispensed with, so that the drawback of rupture of the chain links is eliminated.

The features proposed by the invention make it possible to obtain a high degree of reliability. Due to the fact that the spacers of the invention act as double sprocket spacers that are guided by the rolling elements and not, as is the case with pull chains, in separate channels provided for link plates, less friction occurs and thus also less friction loss. Since the invention does not require link plates, it is also possible to reduce design space.

In their regions situated between the two parallel rows of rolling elements, the spacers may comprise a V-shaped notch into which a retaining bar fixed on the guide carriage adjacent to each long side of the guide rail can engage. The rolling elements guided by a spacer can be enclosed over a larger portion of their circular periphery by the material of the spacer.

A plurality of spacers can be manufactured as plastic parts in the form of a single composite structure by injection molding, a common, thin connecting web that can be easily torn off being formed on every two successive spacers. In the region of rolling element osculation, one or more spacers may comprise pockets that can be used as lubricant reservoirs. The spacers may also be made out of a porous material that stores and continuously releases lubricant.

Examples of embodiment of the invention are represented in the drawing and will be described more closely in the following.

DETAILED DESCRIPTION OF THE DRAWING

FIGS. 1 to 4 show a guide system in end and side views. A guide carriage 2 is slidingly supported on a guide rail 1 by rolling elements 3. The guide carriage 2 contains a total of four re-circulating rolling element rows 4 and 5. In the sectional view, only two of these rolling element rows 4 and 5 of one side are represented. The rolling element row 4 is the upper row whereas the rolling element row 5 is the lower row. The system represented in FIG. 2 has a symmetric construction. The rolling elements 3 in the present case are configured as balls. However, it is conceivable to use rolling elements of any other geometric shape, for example, barrel-shaped or cylindrical rollers. The guide rail 1, on which the guide carriage 2 can slide in axial direction is configured as a profiled rail. Sliding is made possible by the rolling of the rolling elements 3 on the guide rail 1 and on the guide carriage 2.

Figure 1:
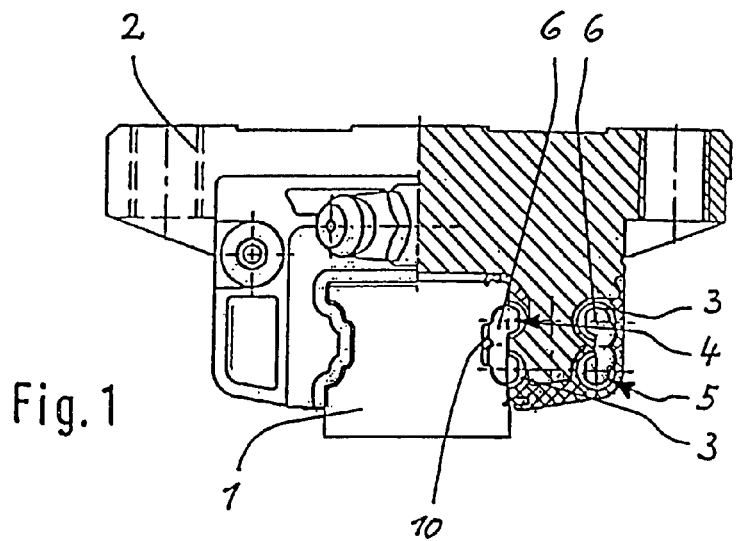
FIG. 1 is an end view of a linear rolling bearing of the invention, also showing a partial cross-section.
Figure 2:
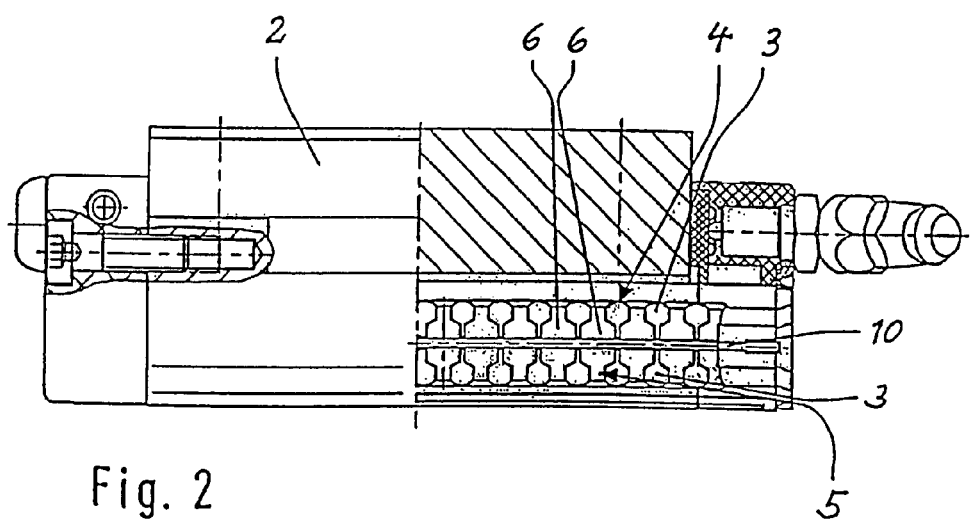
FIG. 2 is a side view of the linear rolling bearing, also showing a partial longitudinal section.
Figure 3:
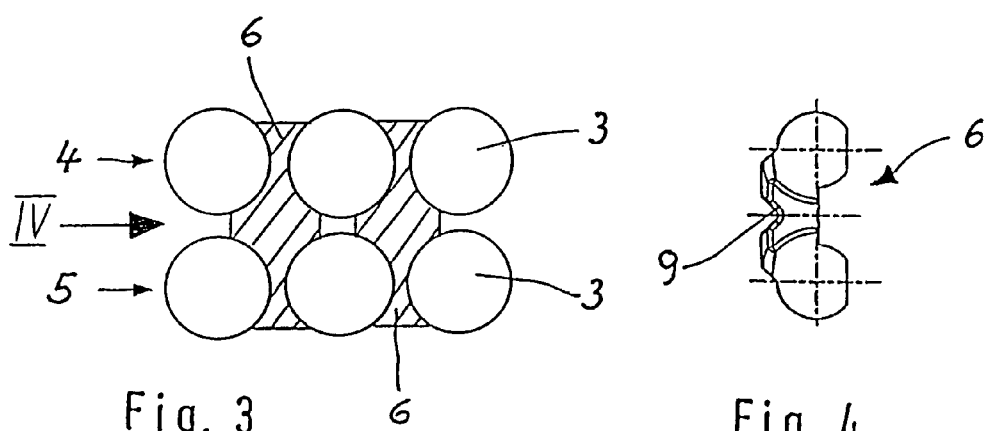
FIG. 3 is a detail showing two parallel rows of rolling elements with two spacers, in a vertical section.

During axial displacement, the rolling elements 3 circulate in the guide carriage 2. If no spacers were provided, the rolling elements could knock against one another during the displacement of the guide carriage 2 and thus produce noises. To prevent such a production of noises, the rolling elements 3 are separated from one another by spacers 6. Each spacer 6 is configured so as to simultaneously separate two rolling elements 3 of the upper row 4 and two rolling elements 3 of the lower row 5 from one another. Such a spacer is represented in FIGS. 3 and 4.

Figure 5:
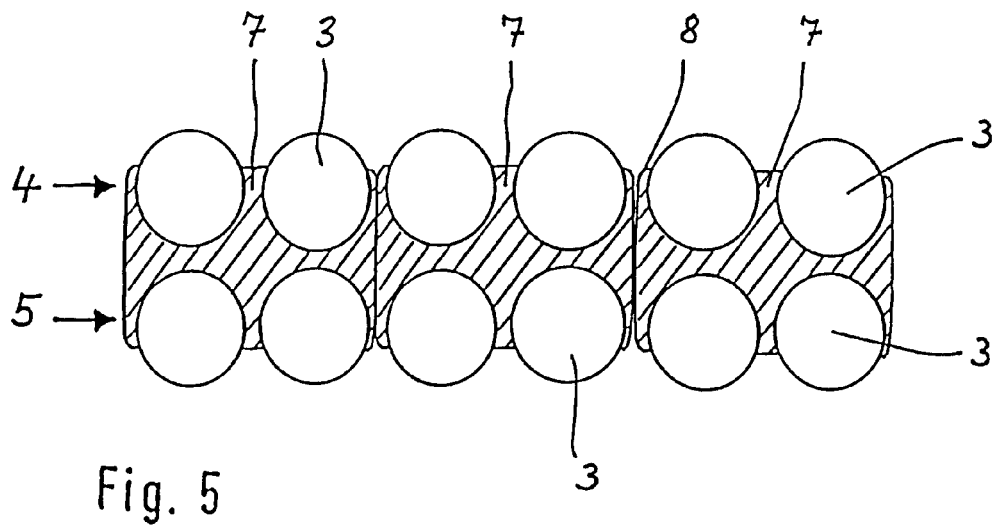
FIG. 5 is a detail showing two parallel rows of rolling elements with three spacers modified with respect to FIG. 3, in a vertical section.
Figure 6:
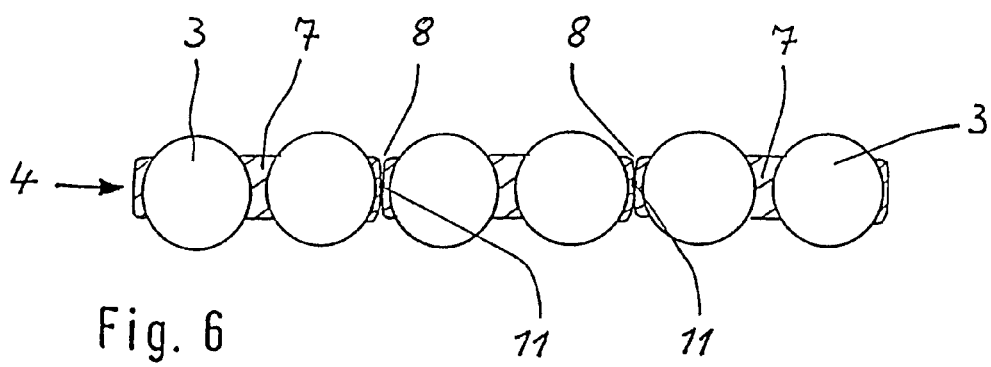
FIG. 6 shows the upper row of rolling elements of FIG. 5 with the spacers, in a vertical section.
Figure 7:
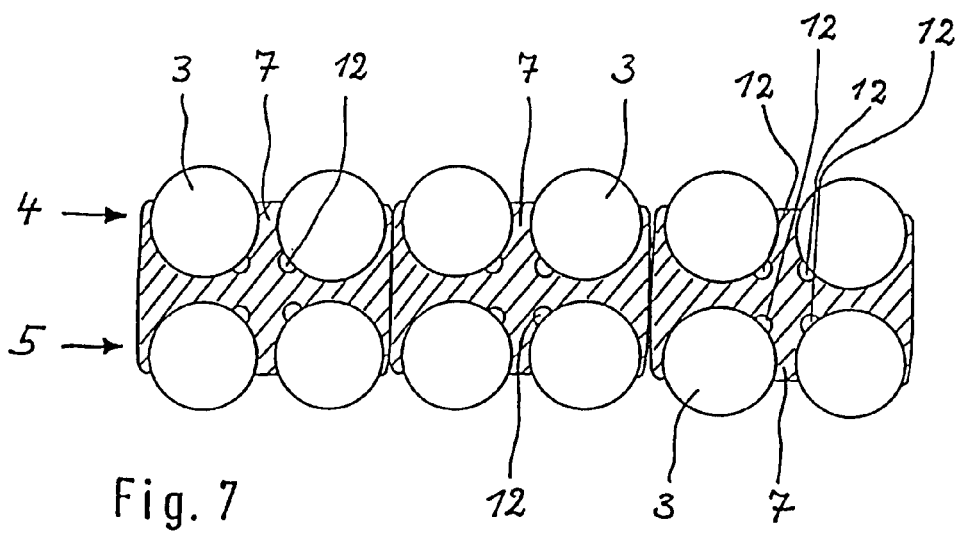
FIG. 7 shows the rolling element rows of FIG. 5 with the spacers comprising lubricant pockets.

A further embodiment of a spacer 7 is shown in FIGS. 5 to 7. In this case, two rolling elements 3 of the upper row 3 are connected to two rolling elements 3 of the lower row 5, so that a total of four rolling elements 3 are arranged on each spacer 7. Further, this spacer 7 is configured so as to surround the rolling elements 3 to the extent that they cannot fall out. A plurality of spacers 7 are arranged in a row behind one another and are in contact with one another through their contact surfaces 8 as shown in FIG. 5.

Figure 4:
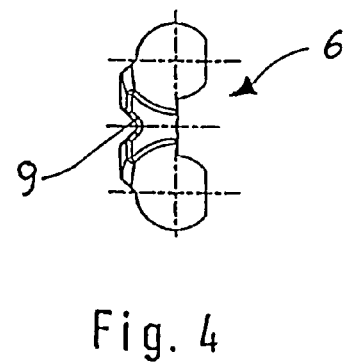
FIG. 4 is a view of a spacer as seen in the direction of the arrow IV of FIG. 3.

In the side view of the spacers 6 (or 7) shown in FIG. 4, a V-shaped notch is to be seen that serves to retain the spacers and as an additional guide groove for a retaining bar 10 also provided in the guide carriage 2. This retaining bar 2 can be seen in FIGS. 1 and 2. As an alternative to the notch 9 shown in FIG. 4, a notch of any other shape may also be implemented. The retaining bar 10 is connected with both its ends to the ends of the guide carriage 2. The retaining bar 10 is arranged between the rail 1 and the spacers 6 of the rolling element rows 4 and 5.

If the guide carriage 2 is removed from the guide rail 1, the retaining bar 10 prevents the spacers 6 (or 7) and the rolling elements 3 from falling out of the guide carriage 2. The rolling elements 3, configured as balls, are surrounded by the spacers 6 and 7 so that they cannot fall out. The retaining bar 10 can be made of plastic or wire or any other suitable material.

To simplify mounting, the spacers 7 made by injection molding can be inter-connected by a thin connecting web 11 as illustrated in FIG. 6. However, this connection should be so thin, that the connecting webs 11 tear open after a few circulations of the rolling element rows 4 and 5 so that the spacers 7 are then separated from one another.

As shown in FIG. 7, in the region of rolling element osculation, the spacers 7 can additionally comprise pockets 12 that act as lubricant reservoirs. It is also conceivable to make the spacers 7 of a porous material that stores lubricant and supplies it continuously to the rolling elements 3.

The advantages that can be obtained with the invention are as follows.

The spacers are guided by the rolling elements. Conventional pull chains require a separate guide channel for guiding link plates; this increases the friction surface and thus also the friction resistance. The use of spacers therefore reduces friction.

Besides this, conventional pull chains can tear apart as a result of dirt accumulation and under high accelerations, so that operational safety is considerably reduced. The use of spacers endows the system with a much higher operational safety and reliability.

Finally, design space requirement is also reduced because link plates are dispensed with.

What is claimed is:

1. A linear rolling bearing system comprising a guide rail and a guide carriage that partially surrounds the guide rail and is supported by balls for sliding on two long sides of the guide rail, the balls being arranged on each of the two long sides in at least two parallel, endlessly recirculating rows of balls and with a plurality of spacers inserted in the circulating rows while a spacer is inserted between every two successive rolling elements of a row, wherein, on each long side of the guide rail, a common spacer for both of said two rows is inserted between every two adjacent balls of a first of said two rows and between every two adjacent balls of a second of said two rows, wherein each spacer has four concave shaped walls adapted to the balls, wherein each concave shaped wall is provided for one ball, and wherein each concave shaped wall encompasses a part of the ball-surface, which part is less than the half of the peripheral surface of the ball, wherein, in a region situated between the two parallel rows of rolling elements, each spacer comprises a V-shaped notch into which a retaining bar fixed on the guide carriage adjacent to each long side of the guide rail engages.

2. A linear roiling bearing of claim 1, wherein, the roiling elements guided by a spacer are enclosed over a major portion of a circular periphery by a material of the spacer.

3. A linear rolling bearing of claim 1, wherein, a plurality of spacers are manufactured as plastic parts in form of a single composite structure by injection molding, a common, thin connecting web that can be easily torn off being formed on every two successive spacers.

4. A linear rolling bearing of claim 1, wherein, in a region of rolling element osculation, at least one spacer comprises pockets that can be used as lubricant reservoirs.

5. A linear rolling bearing of claim 1, wherein the spacers are made of a porous material that stores and continuously releases lubricant.

6. A linear rolling bearing system comprising a guide rail and a guide carriage that partially surrounds the guide rail and is supported by balls for sliding on two long sides of the guide rail, the balls being arranged on each of the two long sides in at least two parallel, endlessly recirculating rows of balls and with a plurality of spacers inserted in the circulating rows while a spacer is inserted between every two successive balls of a row, wherein, on each long side of a guide rail, a common spacer for both of said two rows is inserted between every two adjacent balls of a first of said two rows and between every two adjacent balls of a second of said two rows wherein each spacer has four concave shaped walls adapted to the balls, wherein each concave shaped wall is provided for one ball, and wherein each concave shaped wall encompasses a part of the ball-surface, which part is less than the half of the peripheral surface of the ball.

7. A linear rolling bearing comprising a guide rail and a guide carriage that partially surrounds the guide rail and is supported by rolling elements for sliding on two long sides of the guide rail, the rolling elements being arranged on each of the two long sides in at least two parallel, endlessly recirculating rows of rolling elements while being guided by spacers that are situated in said two rows between the rolling elements, wherein, on each long side of the guide rail, every two adjacent rolling elements of a first of said two rows and every two adjacent rolling elements of a second of said two rows are guided in a common spacer for both of said two rows and in a region situated between the two parallel rows of rolling elements, each spacer comprises a V-shaped notch into which a retaining bar fixed on the guide carriage adjacent to each long side of the guide rail engages.

* * * * *